(12) United States Patent
Ricker (10) Patent No.: US 6,864,597 B1
(45) Date of Patent: Mar. 8, 2005

(54) MULTIAXIS TURBINE

(76) Inventor: Jonathan C Ricker, 11 Maple Ave., Shrewsbury, MA (US) 01545

( * ) Notice: Subject to any disclaimer, the term of this patent is extended or adjusted under 35 U.S.C. 154(b) by 432 days.

(21) Appl. No.: 09/482,038

(22) Filed: Jan. 13, 2000

Related U.S. Application Data (60) Provisional application No. 60/155,587, filed on Sep. 24, 1999, provisional application No. 60/141,524, filed on Jun. 25, 1999, and provisional application No. 60/117,056, filed on Jan. 25, 1999.

(51) Int. Cl.[7] .............................. F02D 7/00; F03D 9/00; F03D 1/02; F03D 1/04
(52) U.S. Cl. .............................. 290/55; 290/43; 290/44; 290/53
(58) Field of Search .............................. 290/43–44, 53, 290/55

(56) References Cited

U.S. PATENT DOCUMENTS

| | | | |
|---|---|---|---|
| 1,835,018 A | | 12/1931 | Darrieus |
| 3,902,072 A | * | 8/1975 | Quinn .......................... 290/44 |
| 4,119,863 A | * | 10/1978 | Kelly .......................... 290/55 |
| 4,156,580 A | * | 5/1979 | Pohl .............................. 415/2 |
| 4,278,894 A | * | 7/1981 | Ciman .......................... 290/44 |
| 4,303,835 A | * | 12/1981 | Bair ............................. 290/55 |
| 4,449,053 A | | 5/1984 | Kutcher |
| 4,585,950 A | * | 4/1986 | Lund ........................... 290/44 |
| 4,832,569 A | * | 5/1989 | Samuelsen et al. ........... 416/17 |
| 4,857,753 A | * | 8/1989 | Mewburn-Crook et al. ... 290/55 |
| 5,272,378 A | * | 12/1993 | Wither ....................... 290/1 R |
| 5,332,925 A | * | 7/1994 | Thomas ....................... 290/44 |
| 5,463,257 A | * | 10/1995 | Yea .............................. 290/55 |
| 5,499,904 A | | 3/1996 | Wallace et al. |
| 5,709,419 A | * | 1/1998 | Roskey ........................ 290/55 |

* cited by examiner

*Primary Examiner*—Nicholas Ponomarenko
*Assistant Examiner*—Pedro J. Cuevas
(74) *Attorney, Agent, or Firm*—Brian M. Dingman, Esq.; Mirick, O'Connell, DeMallie & Lougee, LLP

(57) ABSTRACT

Multiaxis Turbine with an external upper covering, a tower structure with a plurality of vertical elongated members connected to each other with supporting horizontal elongated members, and a plurality of smaller blades on a rotation connected to a tower structure with a plurality of the rotation. A preferred embodiment includes impact impellers connected to a rotation creating a swept area with a height to diameter ratio of greater than four. A preferred embodiment includes wherein said impact impellers connected to a rotation means creating a swept area with a height to diameter ratio of greater than ten.

18 Claims, 10 Drawing Sheets

MULTIAXIS TURBINE

CROSS REFERENCES TO RELATED APPLICATION

This is a continuation in part of Ser. No. 60/117,056, filed Jan. 25, 1999; Ser. No. 60/155,587, filed Sep. 24, 1999, Ser. No. 60/ 141,524, filed Jun. 25, 1999 Disclosure Document No. 460870, filed Aug. 20, 1999, Disclosure Document No. 456066 filed on May 7, 1999.

BACKGROUND OF THE INVENTION

This invention relates generally to the field of wind energy, and more particularly to vertical axis turbines and Turbines with more than one axis or shaft.

Wind turbines utilize a rotor for converting the energy of the air stream into rotary mechanical power as a power conversion device from the wind. Wind machines can take advantage of a free and inexhaustible power source of mechanical power for various purposes including driving an electrical generator. Most wind turbines are the horizontal-axis wind turbine (HAWT). However, many wind turbines are known as vertical-axis turbines (VAWT). The blades of a VAWT are arranged vertically. VAWTs has design advantages including the generator being on the ground level for easier maintenance and avoiding the need to change the blade direction every time the wind changes directions. The most related wind turbines to the invention are the vertical axis turbines VAWT including turbines using Darrieus related technology. Darrieus technology invented by D.J.M. Darrieus comprise of curved blades connected at two points along a rotatable tower. When the turbine rotates, the centrifugal forces are reduced with the blades already bulging outward in a shape known as troposkein before the rotor started spinning. The troposkein shape is similar to the shape a rope would take if it was spun around an axis. As a result, the troposkein shape minimizes stresses due to centrifugal forces. U.S. Pat. No. 1,835,018 has a more detailed information of the Darrieus turbine invented by D.J.M. Darrieus.

In generating large amounts of power, conventional turbines had large rotors in order to generate a sufficient amount of energy in order to make it worthwhile for having a generator in order to produce electricity. Unfortunately, the large rotors are expensive because the stress on the rotors increase dramatically as the diameter increases. Conventional turbines had to increase the diameter of the blades in order to capture more energy by increasing the area of moving air which are impacting on the blades. This increase in the diameter of blades for producing substantial power can increase the cost of other items in the turbine other than the blades. Large blades which have not been properly produced can create structural stress and fatigue problems for the gearbox, tower, and the system that turns the generator toward the optimal wind direction.

In the past, wind turbines were supported by a single tower and guy wires in many cases leading to many vibration and frequency related problems. The blades of vertical axis turbines were large and could be limited in the design and the materials used. For example aluminum extrusion and fiberglass pultrusion were used in the two most serious commercial applications of vertical axis turbines. Due to the large size of the fiberglass blades, the strength was limited in order to bend the blade at the place of installation. The aluminum blades could not form a true troposkein shape. The blades had to be made of significant length and the available extrusion equipment is not available. The patents of both serious commercial prior applications of vertical axis technology are described in "Vertical Axis Wind Turbine" U.S. Pat. No. 4,449,053 and "Vertical Axis Wind Turbine with Pultruded Blades" in U.S. Pat. No. 5,499,904. However, the fatigue factor in blades using those material suffered from structural stress caused by cyclical loads on vertical blades. The lift forces push the blades back and forth as they rotate. The more popular horizontal wind turbines are not subject to this cyclical stress occurring many thousand of times per day. The construction and installation was complex and costly.

The vertical blades in prior technology could not place the rotor high enough above the ground in order to a turbulence leading to long term structural problems In other prior technology, the swept area of the turbine had an aspect ratio of less than four due to construction limitations. The aspect ratio, the swept area height to diameter, is preferred to be high for better efficiency. This occurs when a tall and thin rotor maintains a large swept area and a high RPM. As a result, the moment of inertia is reduced and less energy is spent on its own motion.
In prior blade technology, two or more blades per shaft section was used in order to achieve proper blade balance. The designing of one blade per shaft section was expensive and had imbalance problem in past turbines there were numerous attempts toward developing a horizontal one bladed turbine. However, it was not seriously commercialized.

SUMMARY OF THE INVENTION

The primary object of the invention is to provide more durable blades by resolving cyclical stress problems in vertical axis wind turbines.

Another object of the invention is to reduce manufacturing cost by using more but smaller components instead of larger and fewer components.

Another object of the invention is to provide inexpensive repair and maintenance with components like the generator, heavy variable speed equipment and gearbox while having the rotor high above the ground.

A further object of the invention is to provide longer life for the bearing by reducing structural and mechanical stress.

Yet another object of the invention is to provide a more efficient turbine with reductions in the moment of inertia and easier self starting capability.

Still yet another object of the invention is to provide a more durable blade design by overcoming imbalance problem of using one blade per shaft section with the use of many small blades per shaft.

Another object of the invention is to allow stiffer and more rigid blades by making them smaller.

Another object of the invention is to provide an improved mean to failure ratio by having many components like 256 blades, 16 shafts, and 16 generators.

A further object of the invention is to provide an easier construction method. Yet another object of the invention is to allow for construction with standard parts which do not need to be custom made with the exception of the mass produced blades. The blades can be supplied by several supplier to avoid supplier backlog problems.

Still yet another object of the invention is to enhance structural support by using tower with a larger footprint like an oversized tower section.

Another object of the invention is to provide weather protection and additional structural support with its roof.

Other objects and advantages of the present invention will become apparent from the following descriptions, taken in connection with the accompanying drawings, wherein, by way of illustration and example, an embodiment of the present invention is disclosed.

The invention provides a Multi axis Turbine comprising an external upper covering or roof, a tower structure comprising a plurality of vertical elongated members connected to each other with supporting horizontal elongated members like a large lattice tower section, and a plurality of smaller blades. The blades are connected to a shaft or any other rotation means which is connected to a tower structure with a plurality of shafts. The blades or any form of impact impellers are connected to the shaft or any rotation means creating an aspect ratio or a swept area with a height to diameter ratio of greater than four. Each shafts is connected to a generator near the ground. The structure support for the blades or impact impellers and shafts or rotation means are not individually supported in itself. On the tower structure supports the shafts collectively. The invention comprises vibration absorbing means or bushiness between the bearings or moving parts and the support structure. The plurality of small blades with a simple design of no twist and taper are connected a plurality of generators with each generator connected to each shaft or rotation means of the invention's plurality of shafts or rotation means. A single blade or impact impeller at each section of the rotation means could be placed at different positions or angles along the axis for reducing torque ripple.

The multiaxis turbine was developed in order to simplify the blades cost by reducing their size avoiding larger blades which require an expensive construction cost. Using many smaller blades is a more cost-effective approach than using a large and complex one toward a given power generation unit. The mutiaxis turbine (MAT) has a different approach of positioning the blades for gathering the mechanical power and directing it toward the generator for producing electricity. The MAT also allows for repositioning other parts of wind turbines in order to reduce the complexity of constructing a wind turbine and reducing the impact of vibrations normally associated with wind turbines. The MAT comprises several axes each with a plurality of small vertical axis blades on each axis or shaft. The axes transfer its mechanical energy captured by the small blades preferably by belt and pulley system to an axis or shaft connected to the generator or a gearing device which in turn is connected to the generator. An advantage of this invention is to reduce the cost of producing the turbine systems by allowing cheaper material using an inexpensive vibration protection with reinforcement of the structure or material for protecting the structure. The shape preferably of an airfoil can be added to the structure in order to increase the air velocity approaching the turbine which would result in greater power output. A roof comprise of any cost effective means including cheap plastic would be placed above the wind turbine structure including any VAT system. The roof on this four legged tower structure could be curved into a shape which would increase the air velocity approaching a wind turbine unit preferably a MAT. Less vibrations and better protection would allow the use of cheaper material in the wind system. We can use cheap wooden and less treated elongated structures which is also easier to construct. We would also have the ability to use cheaper materials for other parts like the turbines and bearings as examples. An advantage of the roof is to prevent excess wear and tear from the rain and snow from falling onto the turbine system and causing rapid deterioration including warping and rotting.

The structure could be like a four legged table unlike a one legged table of other wind turbines.

This is similar to the concept behind the lighter but stronger Rolm tower. Therefore it requires less material for the required stability. Although, the four legged tower would bring additional stability, the use an off the shelf bushing of concentric sleeves with rubber, polyurethane or other isolator, absorber and /or damper securely bonded between them would isolate or dampen the vibrations of the moving blades from the steel structure. The bushiness would be placed between the shaft and bearings. The sleeve structure is designed to take up torsional movements as well as axial and radial loads. The design of not having one central blade area allows this "divide and conquer" approach of isolating the vibrations to occur in a cost-effective manner. The belting connecting the generator would isolate vibrations in the electrical area. More importantly, the less vibrations and a stronger tower structure would add years to the life of the turbine at a lower cost. At the same time, the invention would have a less troublesome belt and pulley system for the MAT or Multi axis Turbine. The connection of the mini towers of the MAT would allow a structural reinforcement of the MAT and therefore allowing cheaper tower material.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

The drawings constitute a part of this specification and include exemplary embodiments to the invention, which may be embodied in various forms. It is to be understood that in some instances various aspects of the invention may be shown exaggerated or enlarged to facilitate an understanding of the invention.

Brief Description of the Drawings

FIG. Y shows a side view of the bearing protection structure.

FIG. Z shows a front view of the bearing protection structure.

Detailed Description of the Preferred Embodiments

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
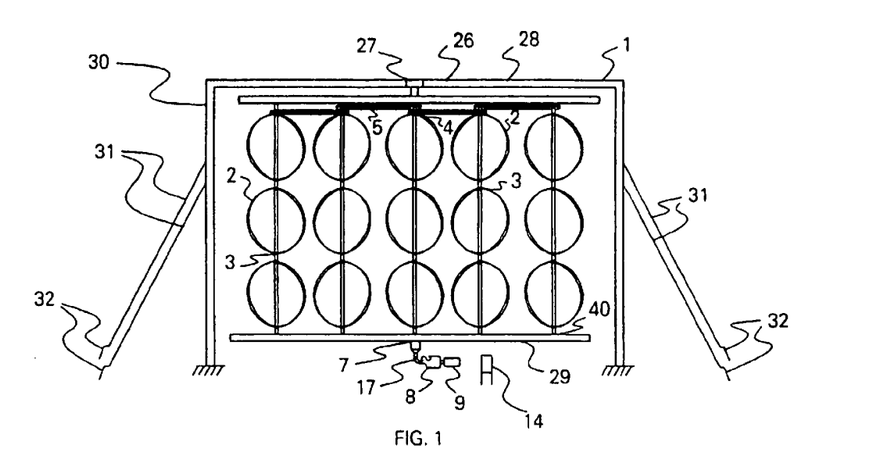
FIG. 1 is the front view of the invention's Preferred Embodiment.
Figure 2:
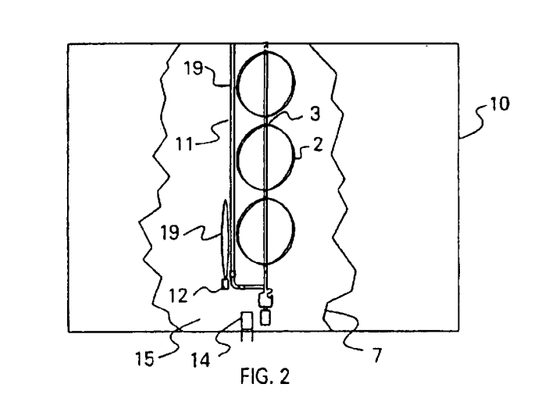
FIG. 2 is the side view of the invention's Preferred Embodiment.
Figure 3:
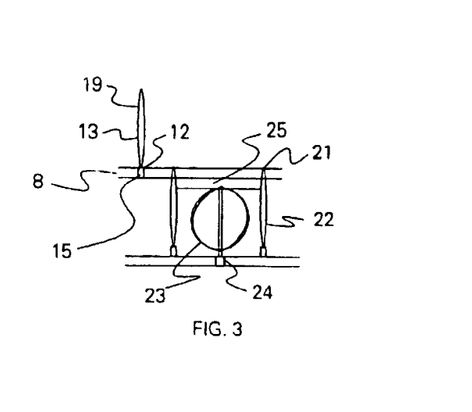
FIG. 3 is a description of the preferred furling control system.
Figure 4:
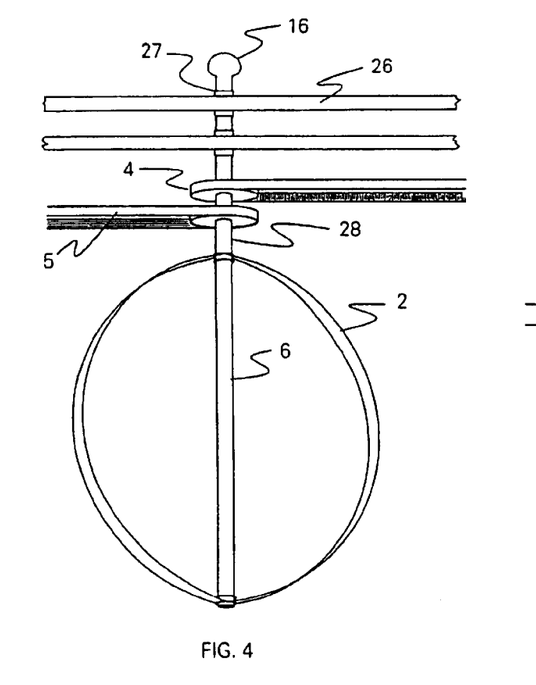
FIG. 4 is a fragmentary sectional view near the top area of the Preferred Embodiment.
Figure 5:
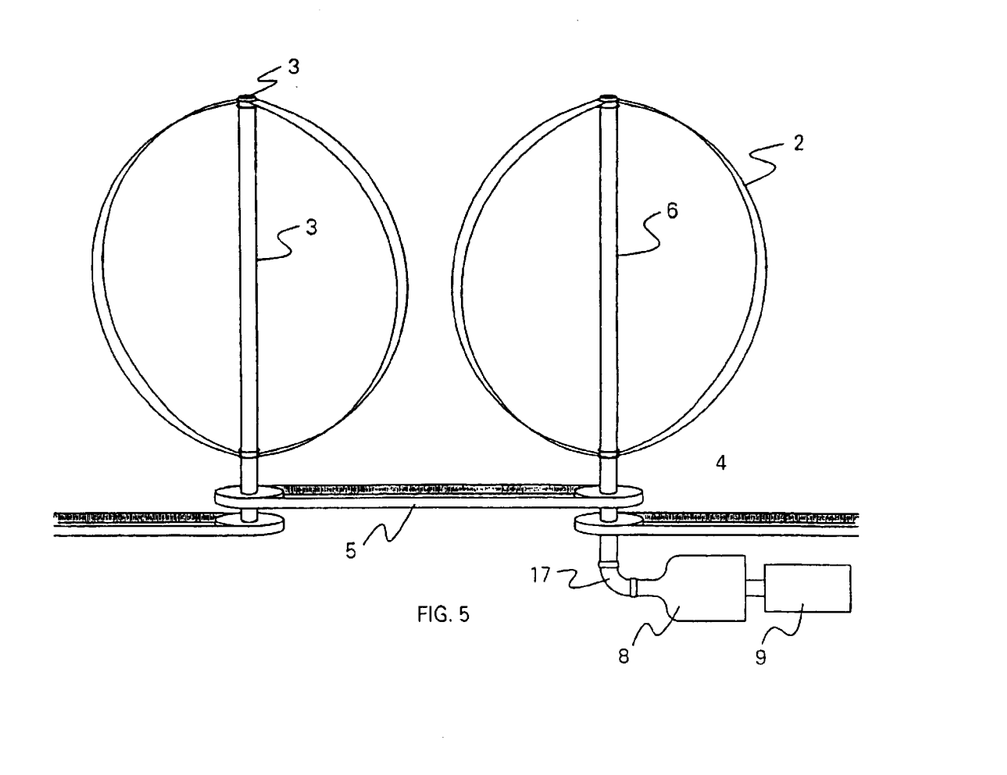
FIG. 5 is a fragmentary sectional view near the generator.

In the preferred embodiment, a Multi axis Turbine comprising a roof or an external upper covering (not shown) has a tower structure using a plurality of elongated member or steel square tubing 1104. The said members are connected to each other with supporting horizontal members or steel tubing 1104. The square tubing or horizontal elongated members are connected to the rotation means or shafts with a bearing. A plurality or several impact impellers also referred to as blades are connected to the shaft. The several blades along each shaft are collectively are creating a swept area with a height greater than four times the diameter. The swept area the blades collectively along each shaft in the preferred embodiment could have an aspect ratio or height to diameter ratio of about ten. Therefore, the blades provide a high aspect ratio. The tower structure allows the swept area per shaft to be very high. Each blade or impact impeller can be small and simple with no twist or taper. It also provides for individual generators for each shaft. Refer now to FIG. 1 and FIG. 2, which are overall drawing of a preferred embodiment of the invention. A MAT 1 or virtual axes turbine is the preferred embodiment of the invention which incorporates interconnected blades 2 preferably vertical axis turbines like the Darrieus or Savonius version for the gathering of mechanical energy on impact as the blades 2 rotate. The blades can be replaceable and non durable unlike in other wind turbines. The loss of blades in damaging winds would not have a serious or an effect on the overall structure of the wind turbine. Rotor shaft 3 are connected to blades 2. As the blades 2 gather energy from the rotation, rotor shaft 3 rotate as a result. This transfer of mechanical energy continues toward other items connected to rotor shaft 3 as illustrated with pulley 4 or sheave connected with rotor shaft 3. Elongated structure 28 is connected to Pulley 4 which continues to carry this energy to belting 5. Elongated structure 29 is also connected with rotor shaft 3 by means 40. This linking interconnection continues to main shaft 6 which also preferably has blades 2 for gathering of mechanical energy. Main shaft 6 is also connected with elongated structure 28 which is further connected to bearing 27. Support elongated structure 26 above main shaft 6 area is connected to elongated structure 28 with bearing 27. With bearing 7 connected to elongated structure 26, the MAT can pivot into an optimal wind direction. Support elongated structure 26 is connected in a cantilevered manner to elongated structure 30 which is further supported to guy wire 31 and guy wire anchor 32. Main shaft 6 is preferably supported by bottom bearing 7 as main shaft 6 is connected to shaft speed increaser 8 and eventually to generator 9. The shaft speed increaser 8 increases the rotation of the main shaft 6 for the purpose of converting the mechanical energy into electrical energy by generator 9. The generator 9 output is controlled by control unit 14. In referring to FIG. 2, as an overall side version of the preferred embodiment, the preferred directional vane means 10 is shown as a means of facing the MAT in an optimal wind direction. Furling system 11 is shown to block the wind like a normal household window shade in order to prevent excessive and damaging output by the generator. Referring to FIG. 3, the preferred Control unit 14 determines the optimal amount of wind blockage for the MAT by using a furling control shaft speed decreaser unit 15 preferably using a pulley and cable connected to a furling motor 18 for turning furling system pulley 12 which is connected to cable 13 and shade 19. Furling motor 18 also turns furling unit pulley 21 and furling unit cable 22 for determining the optimal shade 25 level for furling unit generator 24 or other electric power producing device like an alternator which is determined by the power output gathered by blades 23. Preferably, a normally open relay or diode at 12 volts would turn on furling motor 18 in the direction of lowering shade 19 and shade 25. A normally closed relay or diode at 10 volts would turn on the furling motor 18 in the direction of raising shade 19 and shade 25 when the relay or diode is opened at a rating below 10 volts. Variations of this description could include a furling power generating unit 24 registering as a proportional output to the MAT generator 9 whereas any excessive output rating of generator 9 would turn on the furling motor 18 in the direction of lowering shade 19 and shade 25. When a similar means of registering output shows generator 9 as having an output below its rated output, then the furling motor 18 would turn in the direction of raising the shade. The gearing ratio for the speed decreasing unit 15 would be directly proportional to the height of the VAT and the height of the furling control unit 14. In other words, if the height of the VAT was 21 feet tall and the height of the furling control unit 14 was 3 feet tall, the speed decreasing ratio would be 7 to 1. For example, for every seven inches which the shade 19 is raised (or lowered), shade 25 is raised (or lowered) one inch. The percentage of power output of the furling unit generator 24 in comparison to the power output of generator 9 must be the same percentage of the wind exposed area not influenced by any shade 19 in the furling control unit 14 in comparison to the wind exposed area of the MAT not influenced by any shade 25. Referring to FIG. 4, lightning protection 16 is placed on an elongated structure 26 connected to bearing 27 which is connected to elongated structure 28 further connected to pulley 4. Main shaft 6 is connected to pulley 4. In FIG. 5, an alternative version is shown. Pulley 4, belting 5, main shaft 6, speed increaser 8, and generator 9 are shown with a bevel gear 17.

In FIG. 1, 101 is a roof protecting the MAT. The roof could be aerodynamically curved like roof section 100, which can be detached from the MAT and the portion of the roof directly over it. The detachment allows a cheaper built roof section structure which would not be subject to the vibrations of the spinning turbines. In FIG. 2, vane 10 could be plywood in a stationary version for added structural support with plywood on the roof 101. The vane ( wall) 10 would be parallel to the prevailing wind. Preferably, wall 10 would be shorter than the structure area where the prevailing wind would travel. Heat removal ventilators could be used which could create a vacuum effect along the shaft of turbines for the purpose of accelerating airflow. Adding baffle walls along the side of the MAT or to the roof as a form of wind speed accelerator could be added.

Fins 102 could be added to the generator 9 and gearbox 8 as a heat sink which would allow cooling from the natural airflow of the wind which would result in the ability to produce higher kilowatt output than rated output. The increased ventilation would possible due to the increased weather protection with the invention. A structure to augment airflow could be also be placed around a gearbox and generator for faster cooling resulting in the ability to produce higher kilowatt output. The heat sinks or augmentors used for cooling the heat producing devices could pivot toward the optimal windflow needed for the best cooling methods.

Figures 6, 7:
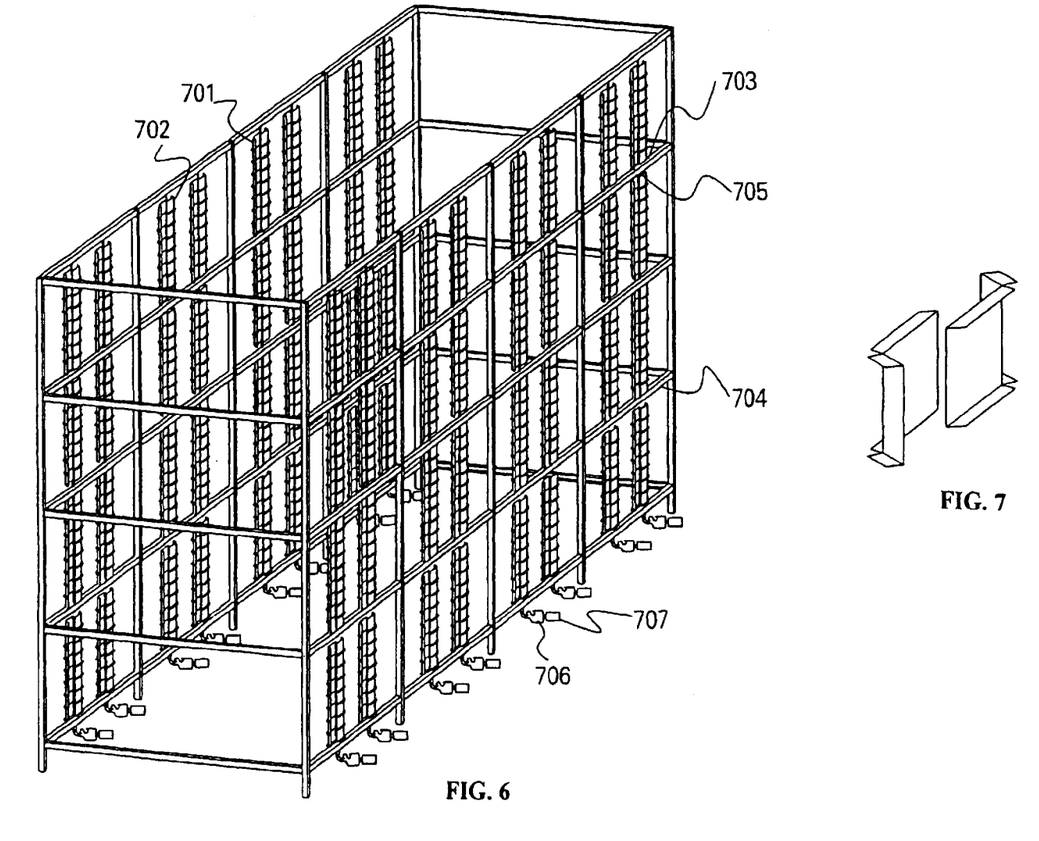
FIG. 6 shows an alternative detail of the footprint version using savonius turbines.
FIG. 7 shows an alternative version of a Savonius turbine.
Figure 8:
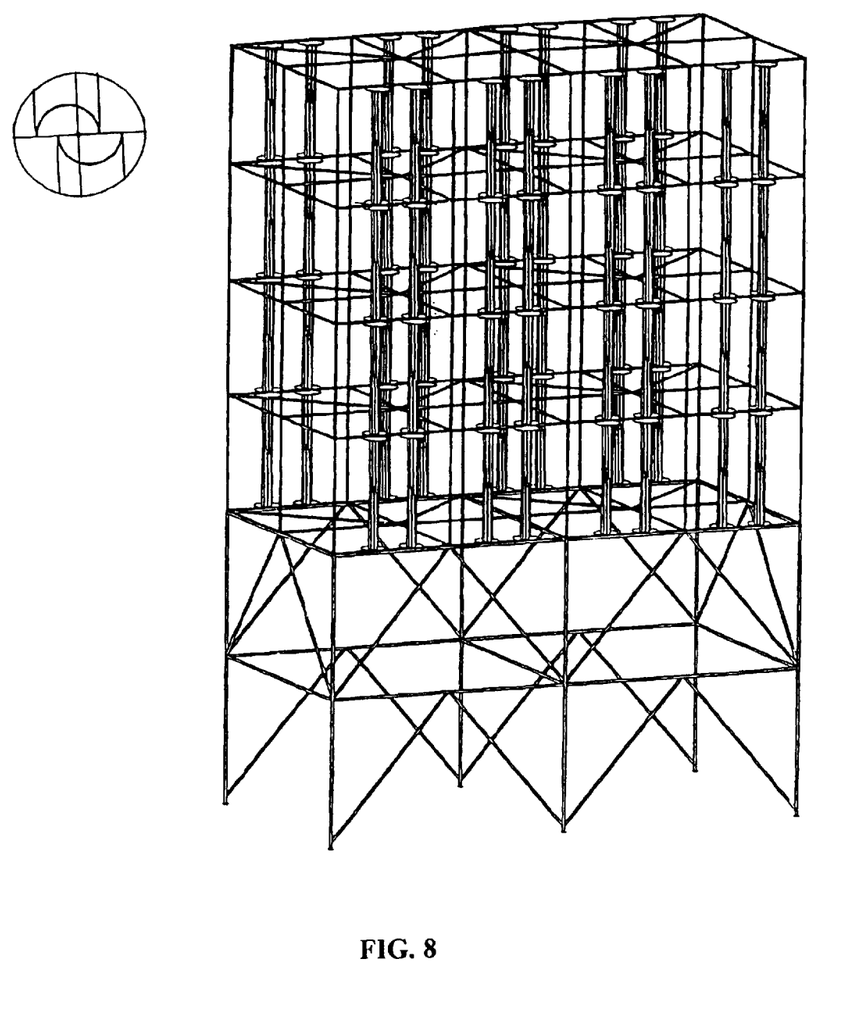
FIG. 8 shows a structural sketch of the turbine and a top view of the Savonius blades.

In addition to the protection methods mentioned, the bearing 104 which connects to shaft 105 can be protected by using a structure 102 shown in FIG. Y and FIG. Z. Barrels 100 can have a circular extension 102 for protecting the area from dirt and dust. A narrow tube 103 which protects the bearing can extend to the bottom of barrel 100 and the top of barrel 106 as a reinforcement of the protection In FIG. 6, the blades 701 (preferably 100 to 3OORPM) gathering energy from the wind are connected to the 2 foot rotor shafts 702 supported by a pillar box roller bearing 7O3. A flange at each end of the set of six 55 gallon plastic drum blades would connect to the rotor shaft. The drum ends being cut in half and positioned may be supported by a flat plastic plywood-shaped structure in between each dorm. The pillar box bearing housing would connect to steel tubing 704 with a vibration absorbing pad 705 in between the steel tubing and bearing housing. The vibration absorbing pad could be isolator mounts or any means to dampen the forces from the rotating blades. In this design, the vibration absorbing areas around the bearings and the gear belt would not only separate the wear and tear forces of the blades with the rest of the system but allow a flexibility to limit the structural stress on the blades themselves. There would be 4 (2 foot) shafts connecting barrels at each row comprising of 2'sets of 6 drums in each set. The barrels could be made of lightweight material comprising of strong foam and preferably a high-density polyethylene to cover the foam in order to withstand the harsh environment of frequent sandstorms. The theretofore polyethylene could be ultraviolet resistant or low density. The steel tubing could be connected and supported by 14 guy wires and 8 guy wire anchors. The guy wire radius would be at least 80% of the tower height. There could be 2 guy wires leading into one foundation on each of the two narrow sides. There would also be 6 guy wires leading into the 3 foundations on each of the two wide sides. The guy wires could comprise of extra-strength strandedsteel cable. The shaft is connected to a shaft speed increaser timing belt and pulley or gearbox 706 and eventually to generator 707. The gearbox increases the rotation of the shaft for the purpose of converting the mechanical energy into electrical energy by generator. A control unit controls the generator output. In FIG. 7, an alternative sharp-edged version of a savonius turbine blade is shown. A side view and top view is illustrated. It allows for less expensive material to be used like corrugated plastic in FIG. 8, the structure could be like a four legged table unlike a one legged table of other wind turbines. This is similar to the concept behind the lighter but stronger Rolm tower. Therefore it requires less material for the required stability. Although, the four legged tower would bring additional stability, the use an off the shelf bushing of concentric sleeves with rubber, polyurethane or other isolator, absorber and /or damper securely bonded between them would isolate or dampen the vibrations of the moving blades from the steel structure. The bushiness would be placed between the shaft and bearings. The sleeve structure is designed to take up torsional movements as well as axial and radial loads. The design of not having one central blade area allows this "divide and conquer" approach of isolating the vibrations to occur in a cost-effective manner. The belting connecting the generator would isolate vibrations in the electrical area.

An object of this invention is preventing excess wear and tear from the rain and snow from falling onto the turbine system and causing rapid deterioration including warping and rotting. More importantly, the reduced vibrations and a stronger tower structure would add years to the life of the turbine at a lower cost. At the same time, the ability to have a less troublesome belt and pulley system for the MAT is another advantage and object of this structure. Other details include:

1) Using the same steel structure for cost savings purposes, the rows of turbines could be a few feet back or forward as not to interfere with the steel structure if a continuous set of blades needing only 2 bearings (one on the top and one on the bottom) is needed for cost savings or engineering purposes. A bearing and shafting every 20 feet would be avoided.
2) Place the MAT on 50-foot supports and add guy wires and cable. Springs near the footings could be helpful toward absorbing vibrations.
3) Use (square or round) flanges as steel connectors similar to pipe connectors in order to accelerate the construction process and reduce the cost of labor on the steel structure. The flanges may or may not be screwed on like many round pipes.
4) Use of the Wind side turbine as blades. Wind side has been known in Europe since 1979
5) Use of vibration absorbers ZZ2 for dampening in areas shown in FIG. 11 and FIG. 12.

Figure 11:
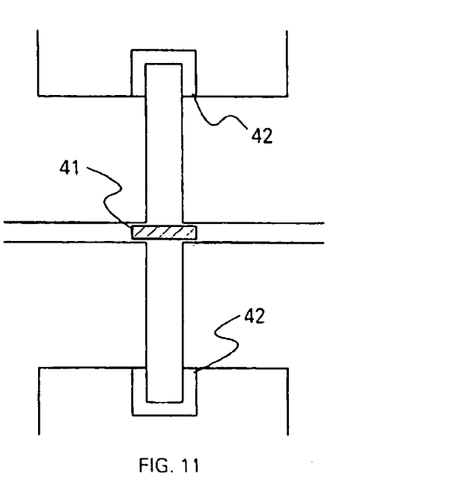
FIG. 11 and 12 shows vibration reducers between the blade and shaft.
Figure 12:
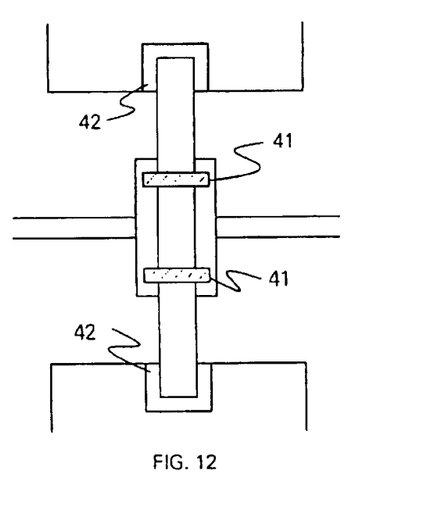

The vibration absorbers comprise of two concentric sleeves with rubber securely bonded between them. The inner sleeve could be bonded to the shaft and the outer sleeve could be bonded the blade as shown in FIG. 11 and FIG. 12. An inner sleeve near the shaft of the vibration absorber may not be fastened to any nearby object including the absorber. The purpose is to increase flexibility of the vibration absorber and to reduce friction even further.

Figure 9:
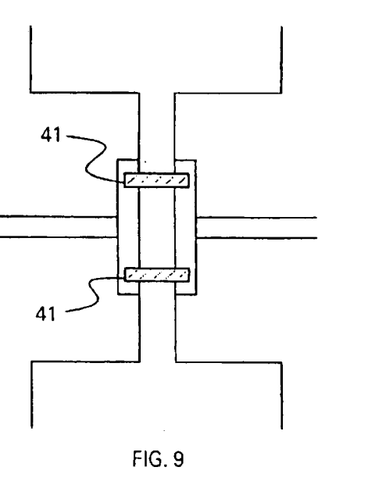
FIG. 9 shows the use of two bearings with damper, absorber, or isolator for preventing misalignment.
Figure 10:
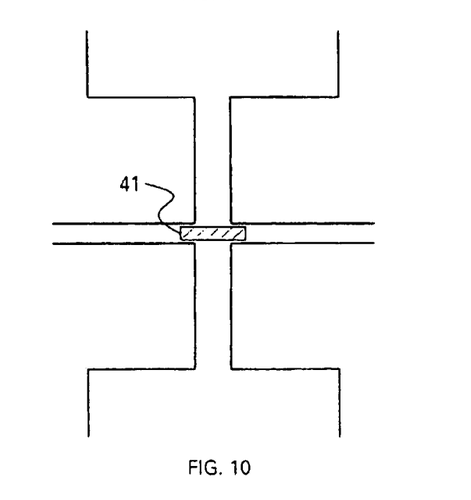
FIG. 10 shows the use of one bearing with vibration reducer.
Figure 13:
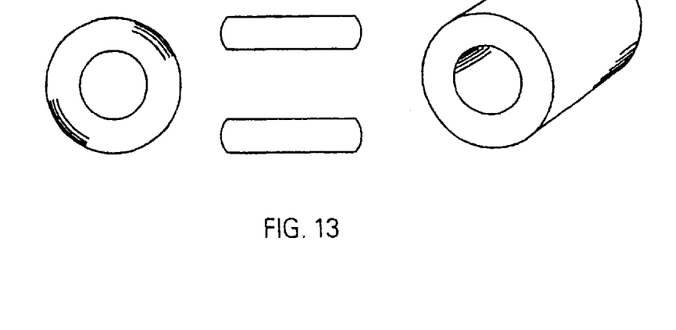
FIG. 13 shows a side and top cut of the vibration reducer as well as a vibration reducer.

6) In FIG. 9 and FIG. 10, the vibration absorbing devices ZZ1 are in the bearing area whereas vibration absorbers comprise of two concentric sleeves with rubber securely bonded between them. The inner sleeve could be bonded to the shaft and the outer sleeve could be bonded to the inner part of the bearing. The side view of ZZ1 and ZZ2 are shown in FIG. 13. An inner sleeve near the shaft of the vibration absorber may not be fastened to any nearby object including the absorber. The purpose is to increase flexibility of the vibration absorber and to reduce friction even further.
7) Rubber or another flexible substance could be mixed in with the foam or plastic in the blade material in order to increase the durability of the blades.

8) The Steel structure may comprise of wood or other less expensive items in areas whereas the more expensive steel can be substituted without compromising the structural integrity.

We can also add augmentors or diffusers to the MAT parallel to the length of the blades especially in areas where the wind speed in from one or two directions. A tail away from the augmentor could avoid structural problem related to excess vibrations.

The use of two flange bearings ZZ1 as shown in FIG. 9 and FIG. 12 connected to a steel flat piece which in turn is bolted or welded to the steel structure could less or eliminate the chances of misalignment during mass production.

Figure 14:
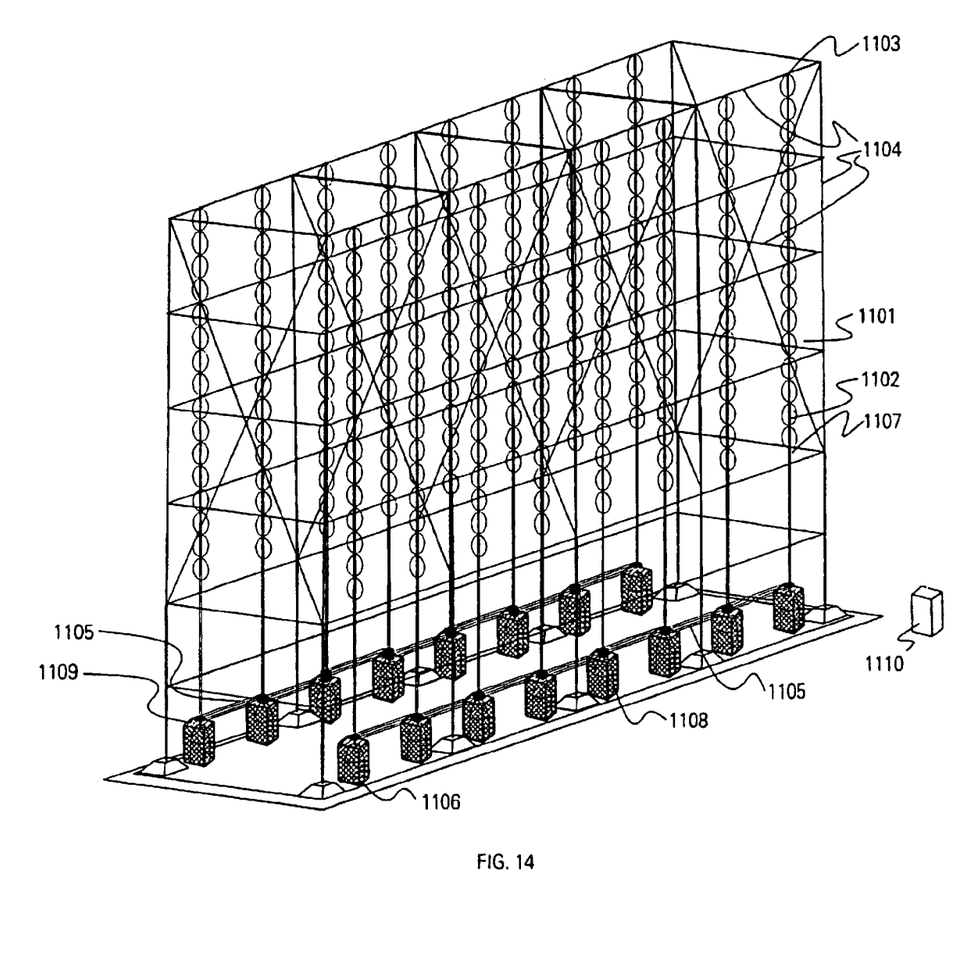
FIG. 14 shows a version a MAT using Darrieus blades.

One of the features of the invention is a wind turbine structure shown in FIG. 14 comprising of a 130-foot high fabricated steel rectangular frame of 80 feet in length and 40 feet wide. The frame is attached to six footings at the ground level. The structure has 16 long shafts of 3 inches in diameter with 16 sets of blades on each shaft.

Figure 15:
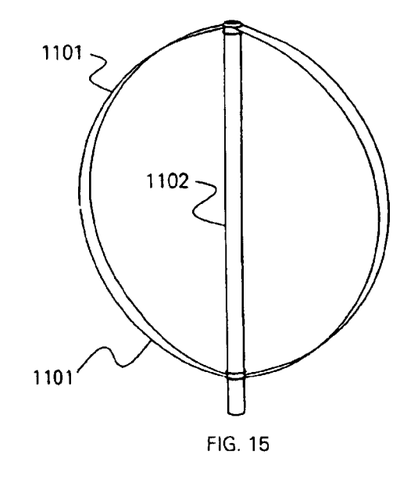
FIG. 15 shows an example of a two Darrieus blades on one section of a rotor shaft.
Figure 16:
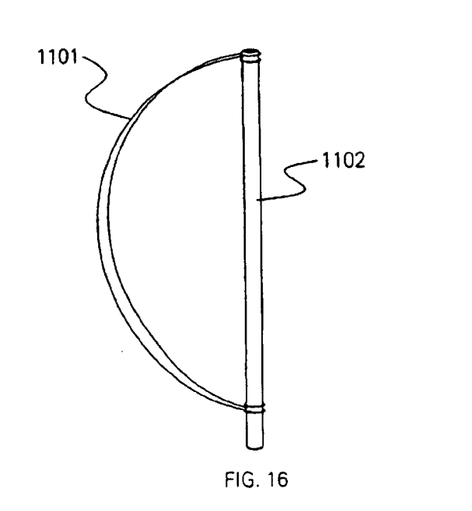
FIG. 16 shows an example of one Darrieus blade per rotor shaft section.

The 256 sets of blades 1101 (900 RPM) gathering energy from the wind are connected to the rotor shafts 1102 supported by pillar box bearings 1103 attached to the supporting structure frame. There are 4 sets of 5-foot diameter blades in between each bearing and structure support beam. Each set of pillar box bearing housings would connect to a steel plate attached to the steel square tubing 1104 at every 20 foot length of the shaft The 130-foot shaft is connected on the ground level to a shaft speed increasing timing belt and pulley 1105 or gearbox and eventually to generator 1106. There could be a plurality of timing belts connecting the generator in order to optimize the number of generators to be activated for the determined wind velocity or air flow. The weight of each shaft and the blades on it is supported by a beefy tapered roller bearing 1107 on the ground level. The generator and gearing areas of each shaft is protected by a cage 1108 for safety reasons with a cage roof 1109 to protect the generator and gearing parts. The gearing increases the rotation of the shaft (2 or 3 times) for the purpose of converting the mechanical energy into electrical energy by generator. A control unit 1110 coordinates the generator output with the utility grid. The (induction) generator has a RPM of 1800. The steel structure is supported by 4 sets of guy wires 1111 on each side. Shown in FIG. 15 is a typical 2 bladed Darrieus turbine set of blades at each shaft section. The blades 1101 are connected to shaft 1102. In FIG. 16, each two blade set shown in FIG. 15 is perpendicular to the blade next to it on the shaft axis in order to reduce mechanical stresses. A pillar box bearing 1103 is at both ends of the shaft 1102 with blades 1101 connected to shaft 1102.

Figure 17:
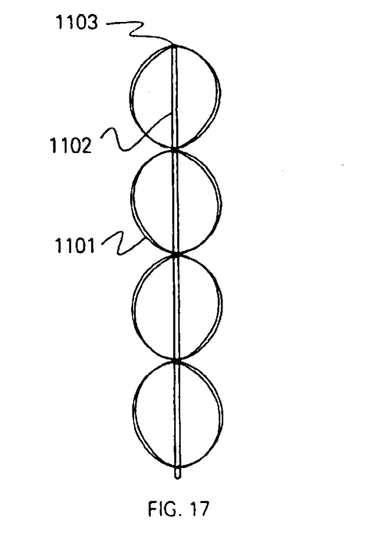
FIG. 17 shows an example of four rotor shaft sections with two Darrieus blades per shaft section.
Figure 18:
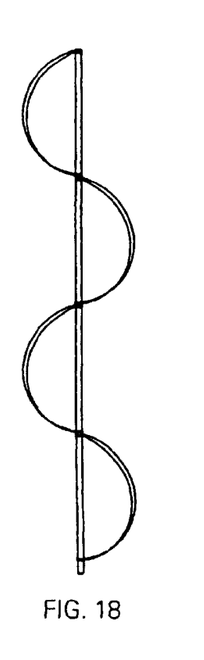
FIG. 18 shows an example of four rotor sections with one Darrieus blade per shaft section.

Shown in FIG. 17 is a one bladed Darrieus turbine set of blades at each shaft section. The blade 1101 are connected to shaft 1102. In FIG. 18, each one bladed blade set shown in FIG. 17 is at a different angle to other Blades the axis to the said blade for reducing torque ripple on the shaft axis in order to reduce mechanical stresses. A pillar box bearing 1103 is at both ends of the shaft 1102 with blades 1101 connected to shaft 1102. The one larger blade allows for the same solidity and efficiency while taking advantage of one larger blade for added strength.

Figure 19:
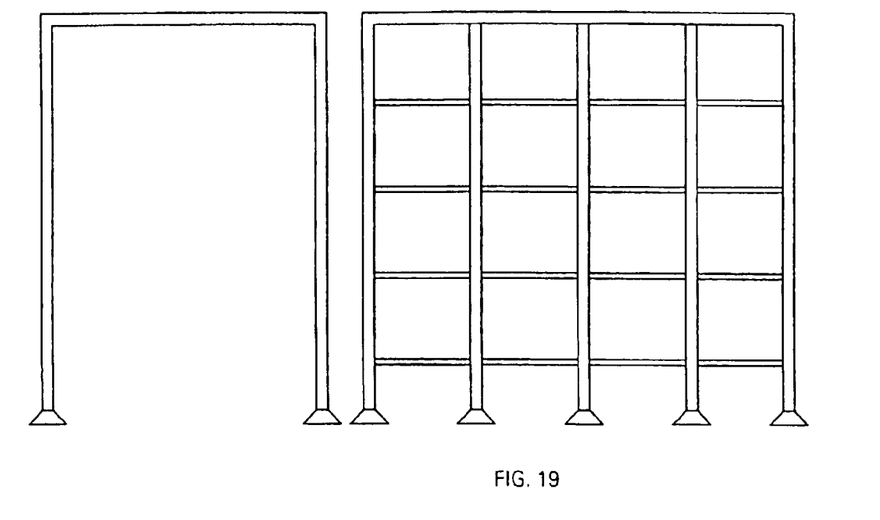
FIG. 19 show an alternative version of the frame structure.

Illustrated in FIG. 19 is the current preferred embodiment of smaller and thinner steel tubing and an alternative version comprising of bigger and fewer steel supports. Steel tubing connectors could be an improved method used for easier and fitter construction. The use of pipe fittings could accelerate construction and reduce cost. The frame or structure could be built in an assembly line approach in pieces and put together on the ground at the location. Then, it could be raised for connection.

Figure 20:
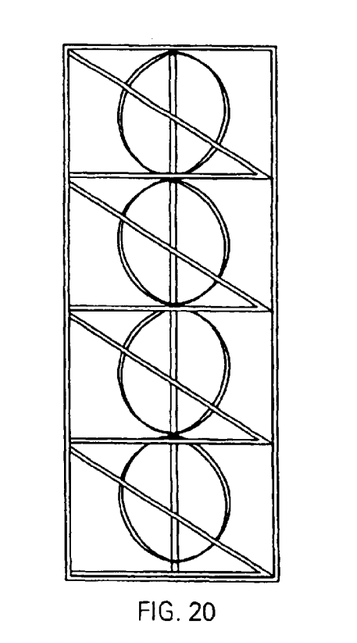
FIG. 20 shows a plurality of blades on one shaft inside a lattice tower.
Figure 21:
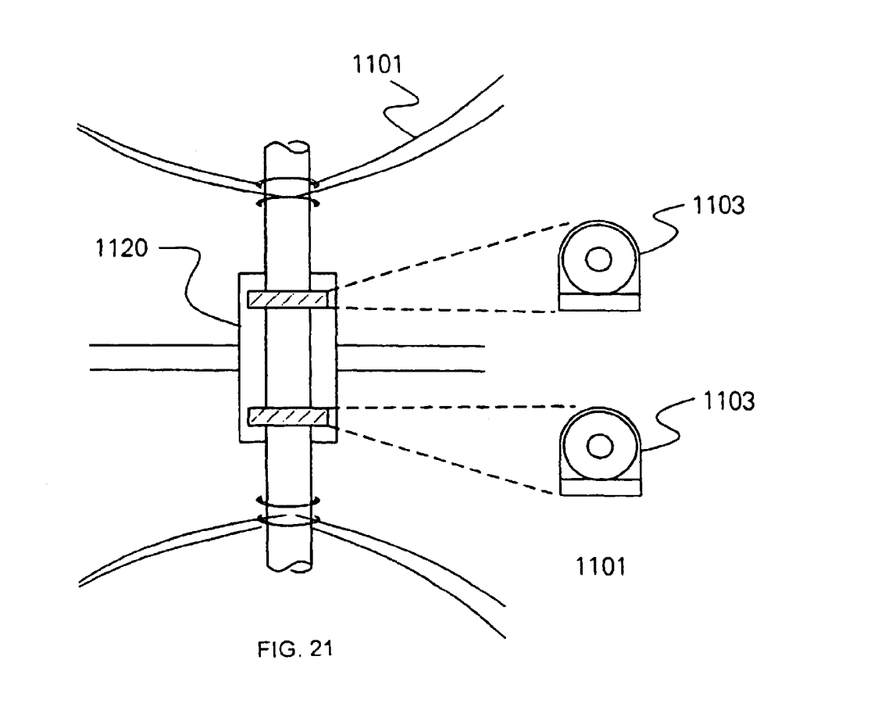
FIG. 21 shows an alternative version of the shaft mounting every 20 feet.

In FIG. 20, a single shaft showing a plurality of blades is illustrated and placed inside a lattice tower. It is a feature of the invention to have a shaft mounting plate 1120 connected to the frame structure as shown in FIG. 21. Two pillar box bearings 1103 are shown to be placed near each other or about one foot in the preferred embodiment in order to reinforce the alignmant of the shaft. The Shaft mounting plate with two bearings are place on a horizontal elongated structure every 20 feet or a similar distance in the preferred embodiment.

Figure 22:
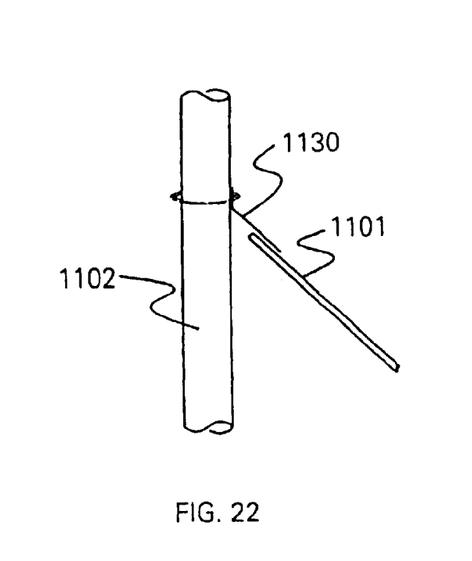
FIG. 22 shows a version of the blade joints.
Figure 23:
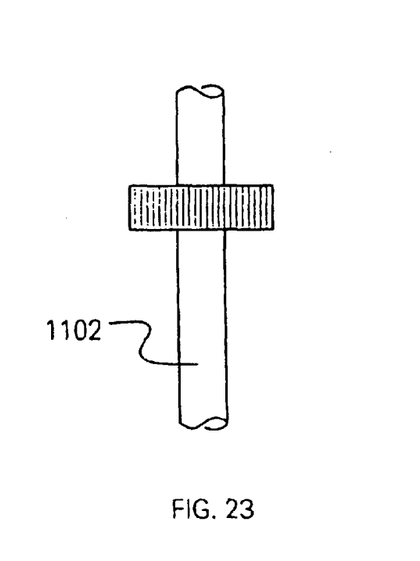
FIG. 23 is a front view of the blade joint.
Figure 24:
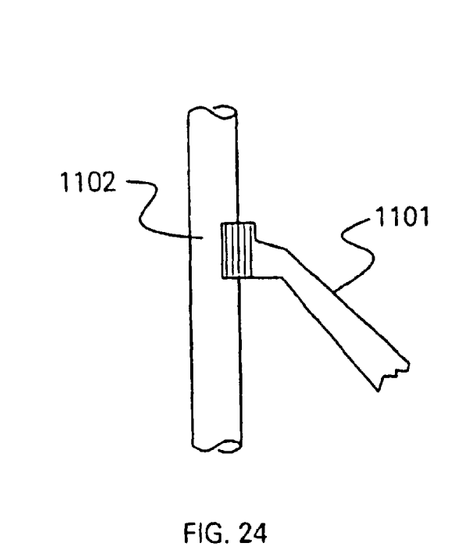
FIG. 24 is a side view of the blade joint.

An added feature of the invention is the blade joints shown in FIG. 22 A blade 1101 is connected to a bracket 1130 which is welded to shaft 1102. In FIG. 23 a mass production front view is illustrated using a bolt-like clamp on an identical bolt-like clamp on the other side of the shaft. In FIG. 24 side view the clamp connected the blade 1101 and shaft 1102 is given.

Figure 25:
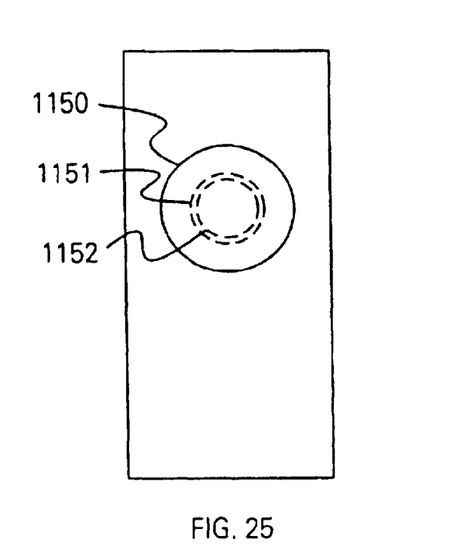
FIG. 25 is an illustration of the cage roof weather protection washer.

In FIG. 25, a top view of a cage roof with a weather protection washer connected to the shaft is shown. Shaft 1152 is connected to the washer showing outer diameter 1150 of the washer and edge 1152 of the hole in the cage roof below the weather washer.

The turbine may include air flow acceleration devices like augmentors or have a larger structure wherein the prevailing wind positions are not prevalent.

It will be understood that each of the elements described above, or two or more together, may also find a useful application in other types of construction differing from the type described above.

While the invention has been illustrated and described as embodied in a virtual axes turbine, it is not intended to be limited to the details shown, since it will be understood that various omissions, modifications, substitutions and changes in the forms and details illustrated and in its operation can be made by those skilled in the art without departing in any way from the spirit of the present invention.

The foregoing description of the preferred embodiment of the invention has been presented for the purposes of illustration and description. It is not intended to be exhaustive or to limit the invention to the precise form disclosed. Many modifications and variations are possible in the light of the above teaching. It is intended that the scope of the invention be limited not by this detailed description, but rather by the claims appended hereto.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by letters patent is set forth in the appended claims:

While the invention has been described in connection with a preferred

What is claimed is:

1. A multiaxis turbine, comprising:
    a tower structure supported on the ground and comprising
        a plurality of vertical elongated structural members connected by a plurality of horizontal elongated structural members, the tower structure forming a box-like structure with at least two active sides;
    a plurality of vertical shafts located coextensively with the active sides of the tower structure, each shaft carrying a plurality of blades adapted to be rotated by the wind, so that the shafts are rotated by the wind;

wherein each shaft is supported by a plurality of the horizontal structural members coupled to the shaft at spaced locations along the shaft, with one support location proximate the top of each shaft, one support location proximate the bottom of each shaft, and at least one support location intermediate the top and bottom support locations;

one or more electric generators located proximate the ground; and means for connecting each shaft to a generator, to generate electricity from the wind energy.

2. The multiaxis turbine of claim 1, wherein each shaft comprises a plurality of shaft sections.

3. The multiaxis turbine of claim 2, wherein each shaft section supports only one, or a pair of blades.

4. The multiaxis turbine of claim 2, wherein each shaft section is supported at both ends by the tower structure.

5. The multiaxis turbine of claim 1, wherein the swept area of each shaft has a height to diameter ratio greater than four.

6. The multiaxis turbine of claim 5, wherein the swept area of each shaft has a height to diameter ratio of at least ten.

7. The multiaxis turbine of claim 1, wherein the blades have no twist or taper.

8. The multiaxis turbine of claim 1, wherein the vibration absorbing means comprises a bushing.

9. The multiaxis turbine of claim 1, further including control means to optimize the number of activated generators depending upon the wind velocity.

10. The multiaxis turbine of claim 1, further including means for coupling a plurality of shafts to a generator.

11. The multiaxis turbine of claim 10, wherein the means for coupling comprises a timing belt.

12. The multiaxis turbine of claim 8, wherein the vibration absorbing means further comprises an inner sleeve between the bearing and the bushing.

13. The multiaxis turbine of claim 12, wherein the sleeve is not bonded to either the bearing or the bushing.

14. The multiaxis turbine of claim 1, further including means for increasing air flow velocity proximate the blades.

15. The multiaxis turbine of claim 1, further including a roof member covering the tower, to protect the shafts and blades from the elements.

16. The multiaxis turbine of claim 1, further including springs between the tower and the ground.

17. The multiaxis turbine of claim 1, further comprising a shaft bearing and a vibration absorbing means between the bearing and the horizontal structural member at each support location, to decrease transmission of vibration between the shafts and the support structure.

18. A multiaxis turbine, comprising:

a tower structure supported on the ground and comprising a plurality of vertical elongated structural members connected by a plurality of horizontal elongated structural members, the tower structure forming a box-like structure with at least two active sides;

a plurality of shafts located coextensively with the active sides of the tower structure, each shaft carrying a plurality of blades adapted to be rotated by the wind, so that the shafts are rotated by the wind, wherein the swept area of each shaft has a height to diameter ratio of at least ten;

wherein each shaft is supported by a plurality of the horizontal structural members coupled to the shaft at spaced locations along the shaft, with one support location proximate the top of each shaft, one support location proximate the bottom of each shaft, and at least one support location intermediate the top and bottom support locations; and wherein each support location comprises a shaft bearing and a vibration absorbing means between the bearing and the horizontal structural member, to decrease transmission of vibration between the shafts to the support structure;

one or more electric generators located proximate the ground; and means for connecting each shaft to a generator, to generate electricity from the wind energy.

* * * * *